3,365,410
BINDERS FOR PAPER COATING COMPOSITIONS

Hermann Wesslau, Bad Duerkheim, Herbert Spoor, Mutterstadt, Pfalz, Heinz Pohlemann, Limburgerhof, Pfalz, and Guenther Addicks and Immo Reinbold, Ludwigshafen (Rhine), Germany, assignors to Badische Anilin- & Soda-Fabrik Aktiengesellschaft, Ludwigshafen (Rhine), Germany
No Drawing. Filed Nov. 13, 1964, Ser. No. 411,104
Claims priority, application Germany, Nov. 20, 1963, B 74,334
8 Claims. (Cl. 260—29.6)

This invention relates to binders for paper coating compositions based on polymers. More particularly it relates to binders prepared by blending two different dispersions.

Paper coating compositions such as are used for the manufacture of coated printing papers consist mainly of a suspension of a pigment or filler, e.g., china clay or titanium dioxide in an aqueous medium containing a binder.

While formerly only natural high molecular weight substances, such as starch or casein, where employed as binders, in recent years use has also been made of synthetic high molecular weight products, mostly in the form of aqueous dispersions, either alone or in admixture with the said natural substances.

Disadvantages of the binders based on natural substances are that they vary in quality, are susceptible to attack by micro-organisms, must be treated by complicated processes and give brittle coatings which for the most part have low resistance to water. Binders based on synthetic high polymers do not have these disadvantages.

Paper coating is usually effected by means of equipment conventionally used in the paper industry, such as brush coaters, air-knife coaters, roller coaters or knife coaters. The roller coating method is used particularly frequently, as this method can be incorporated smoothly into the process of paper manfacture on the paper machine. To be suitable for use in roller coating the coating compositions must have good flow and stability at the shear stresses occurring between the coating rollers; otherwise coagulation takes place and deposits are formed on the rollers so that continuous and uniform application of the coating composition to the paper is made impossible.

Paper coating compositions which only contain binders based on synthetic high polymers do not, in general, satisfy the requirements made on coating compositions to be used in roller coating, especially if the binder content is below 10%, with reference to the amount of china clay used.

We have now found that paper coating compositions which have excellent properties and are suitable for use in roller coating as well as in other coating methods are obtained by using binders which contain mixtures, made approximately neutral to alkaline, of aqueous dispersions of (a) 60 to 95 parts by weight of copolymers A with second-order transition temperatures between −60° and +20° C. derived from 10 to 90 wt. percent of esters of acrylic and/or methacrylic acids with alcohols having from 1 to 8 carbon atoms; 90 to 10 wt. percent of vinyl esters of acetic and/or propionic acids; and 0 to 10 wt. percent of copolymerizable ethylenically unsaturated compounds selected from the group consisting of styrene, styrene-p-sulfonic acid, vinylsulfonic acid, vinyl chloride, vinylidene chloride, ethylenically unsaturated acids having from 3 to 5 carbon atoms, the amides, alkylamides, N-methylolamides, ethers of the N-methylolamides, and esters of the said acids, as well as mixtures of the said compounds, the proportions being selected to total 100%; and (b) 5 to 40 parts by weight of copolymers B from 15 to 55 wt. percent of acrylic and/or methacrylic acids; 25 to 45 wt, percent of esters of acrylic and/or methacrylic acids with alcohols having from 1 to 4 carbon atoms; 20 to 40 wt. percent of esters of acrylic and/or methacrylic acids with alcohols having from 1 to 8 carbon atoms, vinyl acetate, vinyl propionate, acrylonitrile, methacrylonitrile, styrene, vinyl chloride, or mixtures of the said compounds; and 0 to 10 wt. percent of acrylamide and/or methacrylamide, the proportions being selected to total 100%.

Among the esters of acrylic and/or methacrylic acids, those with aliphatic alcohols having from 1 to 8 carbon atoms, e.g., ethyl acrylate, n-butyl acrylate, i-butyl acrylate or 2-ethylhexyl acrylate and the corresponding methacrylates, are particularly suitable. Esters of acrylic acid with alcohols having from 4 to 8 carbon atoms are preferred.

Copolymers A may contain up to 10 wt. percent of copolymerized units of further polymerizable ethylenically unsaturated compounds by which the properties of the copolymer can be modified in conventional manner. This can be done by copolymerization with monomers, such as styrene, vinyl chloride, vinylidene chloride and/or acrylonitrile, particularly by copolymerization with polar monomers. Examples of suitable compounds are ethylenically unsaturated acids having from 3 to 5 carbon atoms in the molecule, their amides, monoalkylamides, dialkylamides, N-methylolamides and ethers of the N-methylolamides. Half-amides and half-esters of the said dicarboxylic acids are also suitable. Examples are acrylic acid, methacrylic acid, crotonic acid, maleic acid, fumaric acid, itaconic acid, maleic half-amide, N-methylolmethacrylamide and its methyl ether, and N-ethylacrylamide. The unsaturated acids are preferred for modification. Moreover, strongly acid monomeric compounds, such as vinylsulfonic acid or styrene-p-sulfonic acid, may take part in the formation of copolymers A. It is also possible to add mixtures of the above-mentioned monomers to the polymerization mixture. However, the total of their proportions must not exceed 10 wt. percent of copolymer A, the proportions of the monomers from which copolymer A is derived being selected to total 100%.

The composition of the mixture of monomers from which copolymer A is made is subject to the following limitation: the second-order transition temperature (as defined by P. J. Flory in "Principles of Polymer Chemistry," Ithaca, N.Y., Cornell University Press, 1953, p. 56) should be between −60° and +20° C. The reason for this condition is that polymer A is the chief component of a binder mixture for paper coating compositions. It must therefore be susceptible to plastic deformation at about room temperature or at temperatures slightly above room temperature so that the finished coating can be glazed in the usual way. All polymers which do not fulfill the above condition are unsuitable for the binders according to this invention. Thus, for example, a copolymer prepared by copolymerization of 80 wt. percent of tert-butyl acrylate, 17 wt. percent of vinyl acetate and 3 wt. percent of acrylic acid has a second-order transition temperature of about 35° C. and is therefore unsuitable as copolymer A. By contrast, copolymers of 35 to 60 wt. percent of n-butyl acrylate, 39 to 60 wt. percent of vinyl acetate and 0.01 to 5 wt. percent of acrylic acid give good results and are preferred.

According to this invention, copolymers B should be derived from: 15 to 55 wt. percent of acrylic and/or methacrylic acids; 0 to 10 wt. percent, in particular 2 to 6 wt. percent, of acrylamide and/or methacrylamide; 25 to 45 wt. percent of esters of acrylic and/or methacrylic acids with alcohols having from 1 to 4 carbon atoms, such as butyl methacrylate or ethyl acrylate; and 20 to 40 wt. percent of hydrophobic, ethylenically unsaturated compounds forming water-insoluble homopolymers.

Examples of such hydrophobic monomers are: esters of acrylic and/or methacrylic acids with alcohols having from 1 to 8 carbon atoms, such as 2-ethylhexyl acrylate, butyl acrylate, ethyl acrylate, vinyl acetate, vinyl propionate, acrylonitrile, methacrylonitrile, styrene, vinyl chloride, and mixture of these monomers. Similar ethylenically unsaturated compounds may also be used. Esters of acrylic and methacrylic acids with aliphatic alcohols which may be identical with or different from the esters taking part in the formation of copolymers B in amounts of 25 to 45 wt. percent are preferred. The properties, e.g., the hardness, of copolymers B may be varied in conventional manner by suitable choice of hydrophobic monomers for the preparation of the copolymers and thus adapted to the special purpose of the paper coating composition in question.

Copolymers A and B may be prepared by polymerization of the monomers in aqueous emulsion by conventional methods, using conventional anionic and/or non-ionic emulsifiers, e.g., potassium n-dodecyl sulfonate, sodium isooctylbenzene sulfonate, a product obtained by reacting p-isooctyl phenol with 25 moles of ethylene oxide, sodium laurate, etc., in amounts of about 0.5 to 5 wt. percent with reference to the monomers to be polymerized.

Conventional radical-forming compounds, such as peroxides, persulfates or azo compounds, e.g., potassium persulfate, cumene hydroperoxide or azodiisobutyric diamide, may be used as polymerization initiators in amounts between about 0.02 and 2 wt. percent with reference to the monomers. In general, the polymerization temperatures used in preparing the copolymers are in the usual range, i.e., between about 50° and 90° C. They may be lower if redox catalysts or activated initiator systems, e.g., a system of potassium persulfate and ascorbic acid, sodium oxymethane sulfonate or triethanolamine, are used.

For regulating the molecular weight, the usual chain transfer agents, e.g., n-dodecyl mercaptan, cyclohexene or carbon tetrabromide, may be used with advantage in amounts of about 0.05 to 0.5 wt. percent with reference to the monomers.

As is well known, the dispersions may be prepared in almost any concentration however low, e.g., in a concentration of 0.5 wt. percent. However, this is uneconomical if the dispersions have to be transported over long distances. The preferred concentrations are between about 20 and about 60 wt. percent.

The binder according to this invention contains a mixture of copolymer A and copolymer B. The relative proportion of the two polymers should be so chosen that the finished mixture should contain 95 to 60 parts by weight of copolymer A and 5 to 40 parts by weight of copolymer B, with reference to the solids. Mixtures containing 90 to 70 parts by weight of copolymer A and 10 to 30 parts by weight of copolymer B are preferred.

To achieve the desired effect it is immaterial whether mixing is carried out before or during the preparation of the coating composition. Nor is the sequence in which the components of the coating composition are combined of any importance regarding the properties of the coating composition or of the coated paper. Nevertheless it is advantageous to mix the aqueous dispersions of copolymers A and B in the desired relative proportion prior to the preparation of the coating composition and to store the finished mixture, because the two dispersions have excellent compatibility with each other, especially if they are mixed in the condition in which they are formed in the usual emulsion polymerization and the carboxyl groups contained in the copolymer are not neutralized prior to mixing. These mixtures are completely stable and may easily be prepared with a solids content of more than 50 wt. percent. They remain mobile until the carboxyl groups present are neutralized with a base, such as ammonia or sodium carbonate. If neutralization is not carried out until after all components of the coating composition except the alkali have been made into a homogeneous mixture, the advantage results in that there is no need to transport highly viscous products; rather, the products to be transported are either mobile, i.e., pumpable, or solid, e.g., the pigment.

If, for example, 77.25 parts by weight of a 50% dispersion of a copolymer A derived from 78 wt. percent of vinyl propionate, 20 wt. percent of n-butyl acrylate and 2 wt. percent of acrylic acid is mixed with 22.75 parts of a 30% dispersion of a copolymer B derived from 75 wt. percent of ethyl acrylate, 20 wt. percent of acrylic acid and 5 wt. percent of acrylamide, the mixture obtained has a solids content of 45 wt. percent. The solids consist of 85 parts by weight of copolymer A and 15 parts by weight of copolymer B. The viscosity of the mixture is 20 centipoises, measured with a Brookfield viscometer, system 5, at 20 r.p.m. After the addition of 2 parts by weight of 25% aqueous ammonia solution to 100 parts by weight of the mixture, the latter becomes a scarcely flowable paste. By contrast, if 100 parts by weight of the mixture is first diluted to a solids content of 30.5 wt. percent by adding 50 parts by weight of water and then 2 parts by weight of 25% aqueous ammonia solution is added, the viscosity of the mixture obtained is 15,300 centipoises, measured with a Broofield viscometer, system 200.

The polymer mixtures according to this invention are eminently suitable as binders for paper coating compositions. Before being used in paper coating they are mixed with fillers, especially with clay or titanium oxide, and, if desired, with other auxiliaries and neutralized by adding alkali, e.g., sodium hydroxide, potassium hydroxide or, preferably, ammonia.

The finished coating compositions can be applied to base paper by any conventional method. One of their advantages is their extremely high shear stability suggesting preferential use of the particularly simple roller coating process. Another advantage is that the polymer mixtures have high binding power which makes it possible to use binder contents as low as 6 to 8 wt. percent, with reference to clay. The coating compositions are also distinguished by good levelling and resistance to attack by micro-organisms, and the finished coating exhibits good resistance to water and exceptional smoothness. Art printing papers coated with these compositions enable excellent prints to be made.

The invention is further illustrated in the following examples, in which the parts specified are parts by weight.

EXAMPLE 1

(a) Preparation of a dispersion of copolymer A:

In a stirred vessel 224 parts of vinyl propionate, 56 parts of n-butyl acrylate, 5.6 parts of acrylic acid, 5.6 parts of an adduct of 25 moles of ethylene oxide and p-isooctyl phenol, 11.2 parts of the same adduct but esterified with sulfuric acid, and 1.2 parts of potassium persulfate are emulsified in 280 parts of water.

20 wt. percent of this mixture is placed in a polymerization vessel and heated to 80° C. with stirring. After polymerization has commenced the remainder of the mixture is added with stirring during the course of about three hours at 82° to 84° C. at the same rate as the polymerization proceeds.

Polymerization is carried to completion over a period of about 30 minutes at 85° C., adding 0.2 part of potassium persulfate dissolved in 8 parts of water. The product is steamed for another 30 minutes at 90° C. while rinsing with nitrogen.

It is allowed to cool and an about 50% polymer dispersion is obtained having a pH of 4.5 and a viscosity of about 15 seconds, measured in a DIN beaker No. 4, the polymer having a K-value (according to Fikentscher, Cellulosechemie 13 (1932) 60) or 59 (1 % in cyclohexanone).

(b) Preparation of a dispersion of copolymer B:

345 parts of water, 0.6 part of potassium persulfate, 1.5 parts of sodium p-isooctylbenzene sulfonate and 0.1 part of sodium pyrophosphate are placed in a polymerization vessel and heated to 85° C. A mixture of 112.5 parts of ethyl acrylate, 30 parts of acrylic acid, 7.5 parts of acrylamide and 0.08 part of dodecyl mercaptan is allowed to flow into the solution during the course of two hours with stirring. Polymerization is carried to completion over a period of about 30 minutes at 90° C. The product is steamed for another 15 minutes while passing in nitrogen.

A 30% polymer dispersion is obtained having a K-value of 68 (1% in cyclohexanone) and a viscosity of 14 seconds, measured in a DIN beaker No. 4.

(c) Preparation of the paper coating composition:

100 parts of china clay is added to an aqueous solution of 0.3 part of sodium polyacrylate with vigorous stirring. 18.6 parts of a mixture of 75 parts of the polymer dispersion prepared according to (a) and 25 parts of that prepared according to (b) is added as binder and the coating composition is adjusted to pH 8 with ammonia. The coating composition has a solids content of 45 wt. percent and a viscosity, at 20° C., of 1,000 centipoises (Brookfield viscometer, 20 r.p.m.).

The paper coating composition thus obtained is applied to a paper consisting of 70% of mechanical pulp, 30% of bleached sulfite pulp, 0.4% of resin and 4% of alum and having an ash content of 20% and a weight of 80 g./cm.², on a roller coater between two resilient rollers of different hardness at a nip pressure of 15 kg./cm. No coagulation takes place and no deposits are formed on the rollers even after prolonged operation. The coated and supercalendered paper is very smooth and glossy and enables excellent prints to be made, particularly in intaglio printing.

A paper coating composition prepared using 16 parts of dispersion (a) alone but otherwise in the same way as described above has a viscosity of 21 centipoises (Brookfield viscometer, 20 r.p.m.) at 20° C. When this composition is applied to paper by the method indicated above, thick deposits are formed on the rollers after a few minutes so that uniform coating is impossible.

EXAMPLE 2

Preparation of the coating composition is carried out in the same way as indicated in Example 1, except that 16.3 parts, with reference to china clay, of a mixture of 70 parts of a 50% dispersion of a copolymer derived from 55 parts of butyl acrylate, 45 parts of vinyl acetate and 2 parts of acrylic acid and 30 parts of the copolymer dispersion described in Example 1, Section (b), is used as the binder.

The coating composition has a solids content of 45% and a viscosity of 1,000 centipoises (Brookfield viscometer, 20 r.p.m.) at 20° C. and may be used in the same way as the coating composition according to Example 1.

EXAMPLE 3

To prepare a 60% coating composition, 100 parts of china clay is added to an aqueous solution of 0.3 part of sodium polyacrylate with vigorous stirring. 17.6 parts of a mixture of 85 parts of the copolymer dispersion prepared according to Example 1, Section (a), and 15 parts of that prepared according to Example 1, Section (b), is added to the pigment slurry as binder. The coating composition is adjusted to pH 8. It has a viscosity of 2,400 centipoises (Brookfield viscometer, 20 r.p.m.) at 20° C. and may be applied to paper by blade coating with very good results.

EXAMPLE 4

As described in Example 3, a 60% coating composition is prepared from 100 parts of china clay and 15 parts of binder. A mixture of 85 parts of a 50% dispersion of a copolymer derived from 55 parts of n-butyl acrylate, 45 parts of vinyl acetate and 2 parts of acrylic acid and 15 parts of a 30% dispersion of a copolymer derived from 75 parts of ethyl acrylate, 5 parts of butyl acrylate and 20 parts of acrylic acid is used as the binder. After adjustment of the pH to 8, a viscosity of 3,200 centipoises (Brookfield viscometer, 20 r.p.m.) is measured. The coating composition can be applied to paper on a blade coater with very good results.

EXAMPLE 5

When following the procedure described in Example 4 and using as the binder a mixture of 80 parts of a 50% dispersion of a copolymer derived from 60 parts of vinyl acetate, 15 parts of tert-butyl acrylate, 25 parts of n-butyl acrylate and 2.5 parts of acrylic acid and 20 parts of a 45% dispersion of a copolymer derived from 45 parts of ethyl acrylate, 30 parts of acrylonitrile, 20 parts of acrylic acid and 5 parts of methacrylamide, a coating composition is obtained which has a viscosity of 3,500 centipoises at 20° C. and can be used in blade coating without difficulty.

We claim:

1. Compositions useful for producing smooth and glossy coated paper, said compositions consisting mainly of a suspension of a pigment or filler in an aqueous medium and containing copolymer mixtures, made neutral to alkaline, of mixtures of aqueous dispersions of
    (a) 60 to 95 parts by weight of copolymers A with a second-order transition temperatures between $-60°$ and $+20°$ C. derived from 10 to 90 wt. percent of esters of alcohols having from 1 to 8 carbon atoms with an $\alpha,\beta$-ethylenically unsaturated acid selected from the group consisting of acrylic acid, methacrylic acid and mixtures thereof, and
    90 to 10 wt. percent of a vinyl ester of a monocarboxylic acid selected from the group consisting of acetic acid, propionic acid and mixtures thereof, the proportions being selected to total 100%, and
    (b) 5 to 40 parts by weight of copolymers B derived from 15 to 55 wt. percent of an ethylenically unsaturated acid selected from the group consisting of acrylic acid, methacrylic acid and mixtures thereof,
    0.01 to 10 wt. percent of a compound selected from the group consisting of acrylamide, methacrylamide and mixtures thereof,
    24 to 45 wt. percent of esters of alcohols having from 1 to 4 carbon atoms with an $\alpha,\beta$-ethylenically unsaturated acid selected from the group consisting of acrylic acid, methacrylic acid and mixtures thereof, and
    20 to 40 wt. percent of ethylenically unsaturated compounds selected from the group consisting of esters of acrylic acid with alcohols having from 1 to 8 carbon atoms, esters of methacrylic acid with alcohols having from 1 to 8 carbon atoms, vinyl acetate, vinyl propionate, acrylonitrile, methacrylonitrile, styrene, vinyl chloride and mixtures of said compounds, the proportions being selected to total 100%.

2. Compositions useful for producing smooth and glossy coated paper, said compositions consisting mainly of a suspension of a pigment or filler in an aqueous medium and containing copolymer mixtures, made neutral to alkaline, of mixtures of aqueous dispersions of
    (a) 60 to 95 parts by weight of copolymers A with second-order transition temperatures between $-60°$ and $+20°$ C. derived from 10 to 89 wt. percent of esters of alcohols having from 1 to 8 carbon atoms with an $\alpha,\beta$-ethylenically unsaturated acid selected from the group consisting of acrylic acid, methacrylic acid and mixtures thereof, 89 to 10 wt. percent of a vinyl ester of a monocarboxylic acid selected from the group consisting of acetic acid, propionic acid and mixtures thereof, and 0.01 to 10 wt. percent of copolymerizable ethylenically unsaturated compounds selected from the group consisting of styrene, styrene-p-sulfonic acid, vinylsulfonic acid, vinyl chloride, vinylidene chloride, ethylenically unsaturated acids having from 3 to 5 carbon atoms, their amides, their alkylamides, their N-methylolamides, ethers of their N-methylolamides, esters of said acids and mixtures of said compounds, the proportions being selected to total 100%, and (b) 5 to 40 parts by weight of copolymers B derived from 15 to 55 wt. percent of an ethylenically unsaturated acid selected from the group consisting of acrylic acid, methacrylic acid and mixtures thereof, 0.01 to 10 wt. percent of a compound selected from the group consisting of acrylamide, methacrylamide and mixtures thereof, 24 to 45 wt. percent of esters of alcohols having from 1 to 4 carbon atoms with an $\alpha,\beta$-ethylenically unsaturated acid selected from the group consisting of acrylic acid, methacrylic acid and mixtures thereof, and 20 to 40 wt. percent of ethylenically unsaturated compounds selected from the group consisting of esters of acrylic acid with alcohols having from 1 to 8 carbon atoms, vinyl acetate, vinyl propionate, acrylonitrile, methacrylonitrile, styrene, vinyl chloride and mixtures of said compounds, the proportions being selected to total 100%.

3. Compositions useful for producing smooth and glossy coated paper, said compositions consisting mainly of a suspension of a pigment or filler in an aqueous medium and containing copolymer mixtures, made neutral to alkaline, of mixtures of aqueous dispersions of (a) 70 to 90 parts by weight of copolymers A with second-order transition temperatures between $-60°$ and $+20°$ C. derived from 35 to 60 wt. percent of esters of alcohols having from 1 to 4 carbon atoms with an $\alpha,\beta$-ethylenically unsaturated acid selected from the group consisting of acrylic acid, methacrylic acid and mixtures thereof.

39 to 60 wt. percent of a vinyl ester of a monocarboxylic acid selected from the group consisting of acetic acid, propionic acid and mixtures thereof, and 0.1 to 5 wt. percent of an ethylenically unsaturated acid having from 3 to 5 carbon atoms, the proportions being selected to total 100%, and (b) 10 to 30 parts by weight of copolymers B derived from 15 to 30 wt. percent of a copolymerizable ethylenically unsaturated acid selected from the group consisting of acrylic acid, methacrylic acid and mixtures thereof, 2 to 6 wt. percent of a compound selected from the group consisting of acrylamide, methacrylamide and mixtures thereof, 23 to 45 wt. percent of esters of alcohols having from 1 to 4 carbon atoms with an $\alpha,\beta$-ethylenically unsaturated acid selected from the group consisting of acrylic acid, methacrylic acid and mixtures thereof, and 20 to 40 wt. percent of esters of alcohols having from 1 to 8 carbon atoms with an $\alpha,\beta$-ethylenically unsaturated acid selected from the group consisting of acrylic acid, methacrylic acid and mixtures thereof, the proportions being selected to total 100%.

4. Binders for paper coating compositions as claimed in claim 1 wherein copolymer B is derived from 2 to 6% by weight of a compound selected from the group consisting of acrylamide, methacrylamide and mixtures thereof.

5. Binders for paper coating compositions as claimed in claim 2 wherein copolymer B is derived from 2 to 6% by weight of a compound selected from the group consisting of acrylamide, methacrylamide and mixtures thereof.

6. Smooth and glossy coated paper comprising a paper substrate roller coated with a composition as claimed in claim 4.

7. Smooth and glossy coated paper comprising a paper substrate roller coated with a composition as claimed in claim 5.

8. Smooth and glossy coated paper comprising a paper substrate roller coated with a composition as claimed in claim 3.

References Cited
UNITED STATES PATENTS

| | | | |
|---|---|---|---|
| 3,081,198 | 3/1963 | Miller | 260—901 |
| 3,122,446 | 2/1964 | Gold et al. | 117—155 |
| 3,222,419 | 12/1965 | Jubilee et al. | 260—29.6 |

SAMUEL H. BLECH, *Primary Examiner.*

MURRAY TILLMAN, *Examiner.*

J. L. WHITE, *Assistant Examiner.*